United States Patent [19]
Arisawa et al.

[11] Patent Number: 6,105,552
[45] Date of Patent: Aug. 22, 2000

[54] ABNORMAL COMBUSTION DETECTION APPARATUS AND METHOD FOR INTERNAL COMBUSTION ENGINE

[75] Inventors: Katsuhiko Arisawa, Susono; Shinichi Okabe, Okazaki; Tokio Kohama, Nishio; Kiyohito Watanabe, Okazaki, all of Japan

[73] Assignee: Toyota Jidosha Kabushiki Kaisha, Aichi-ken, Japan

[21] Appl. No.: 09/255,765

[22] Filed: Feb. 23, 1999

[30] Foreign Application Priority Data

Feb. 27, 1998 [JP] Japan .................................. 10-47769

[51] Int. Cl.⁷ .............................. F02P 5/152; G01L 23/22
[52] U.S. Cl. ..................................... 123/406.37; 73/35.06; 73/116; 123/406.45
[58] Field of Search ........................ 123/406.37, 406.38, 123/406.39, 406.45; 73/35.06, 35.09, 35.11, 116

[56] References Cited

U.S. PATENT DOCUMENTS

| 4,265,205 | 5/1981 | Garcea | 123/406.26 |
| 6,020,742 | 2/2000 | Kano et al. | 73/116 X |

FOREIGN PATENT DOCUMENTS

| 1-88042 | 6/1989 | Japan . |
| 9-236073 | 11/1996 | Japan . |

*Primary Examiner*—Tony M. Argenbright
*Attorney, Agent, or Firm*—Kenyon & Kenyon

[57] ABSTRACT

An abnormal combustion detection apparatus for an internal combustion engine quickly detects the occurrence of preignition by using a knock sensor. When the knock sensor detects an engine knocking, the ignition timing is delayed. If despite the delay of ignition timing, the knocking is not decreased and the air-fuel ratio detected after the delay of ignition timing is less than the air-fuel ratio detected before the delay of ignition timing, it is determined that preignition has occurred.

14 Claims, 7 Drawing Sheets

ABNORMAL COMBUSTION DETECTION APPARATUS AND METHOD FOR INTERNAL COMBUSTION ENGINE

INCORPORATION BY REFERENCE

The disclosure of Japanese Patent Application No. HEI 10-47769 filed on Feb. 27, 1998, including the specification, drawings and abstract, is incorporated herein by reference in its entirety.

BACKGROUND OF THE INVENTION

1. Field of the invention

The present invention relates to an abnormal combustion detection apparatus and an abnormal combustion detection method for detecting abnormal combustion caused by pressure vibration in a combustion chamber of an internal combustion engine.

2. Description of the Related Art

Knock control systems have become normal equipment in recent automotive gasoline engines. A typical knock control system includes a knock sensor provided in a cylinder block for detecting an engine knock on the basis of pressure vibrations that occur in a combustion chamber at a frequency band specific to engine knocking. If the knock sensor detects an engine knock, the combustion chamber temperature is decreased by delaying the igniting timing so as to prevent extension or growth of the knocking. Therefore, the ignition timing is maintained at or near the minimum spark advance for the best torque while the engine knocking is substantially prevented or minimized, so that high output can be achieved.

In a recent technology for improving the fuel consumption efficiency and reducing emissions, the compression ratio setting is increased and the air-fuel ratio is set to a stoichiometric value. This technology tends to increase the combustion temperature, and gives rise to a danger of causing preignition, that is, spontaneous ignition that occurs earlier than the set ignition timing, if an engine knocking occurs and adds to the increase in combustion temperature. To cope with this problem, Japanese Utility Model Application Laid-open No. HEI 1-88042 proposes an abnormal combustion detection method that performs a knock determination based on a pressure pulsation that is detected in a combustion chamber by a knock sensor when preignition occurs. If the knock sensor detects the pressure pulsation during a predetermined period of time prior to the set ignition timing, it is determined that preignition has occurred. If the knock sensor detects the pressure pulsation after the set ignition timing, it is determined that engine knocking has occurred.

Japanese Patent Application Laid-open No. HEI 9-236073 proposes a technology wherein an ion current that occurs at the time of preignition is extracted to an ignition coil.

However, the abnormal combustion detection method based on detection of a pressure vibration, as disclosed in Japanese Utility Model Application Laid-open No. HEI 1-88042, is unable to discriminate until after the ignition timing a pressure pulsation caused by an engine knocking resulting from preignition that occurs immediately before the ignition timing from a pressure pulsation caused by an engine knocking that occurs after the ignition timing. Therefore, the method has a problem of a considerable delay in determining occurrence of preignition. The technology as disclosed in Japanese Patent Application Laid-open No. HEI 9-236073 needs a device for detecting an ion current, thereby requiring a complicated system construction and suffering a disadvantage in cost. Thus, there is a strong demand for quick detection of preignition through the use of a signal from a conventional knock sensor.

SUMMARY OF THE INVENTION

Through research on the air-fuel ratio in relation to occurrence of preignition, the present inventors have found that when preignition occurs, the resultant knocking does not decrease though the ignition timing is delayed, so that the knocking abnormally increases the combustion chamber temperature and therefore reduces the charging efficiency, resulting in decreases in the flow of air into the combustion chamber and in the air-fuel ratio. FIGS. 3A through 3D and FIGS. 4A through 4D are schematic illustrations of changes in the air-fuel ratio with an amount of fuel injected being maintained constant, changes in the knock sensor output, changes in the ignition plug electrode temperature and a change in the ignition timing, in the case where an ordinary engine knocking occurs and in the case where preignition occurs. Referring to the graphs of FIGS. 3A through 3D with regard to the case where an ordinary knocking occurs without preignition, if the ignition timing is delayed in response to occurrence of a knocking, the knocking immediately decreases, so that the ignition plug electrode temperature, which is representative of the temperature of the interior of the combustion chamber, decreases, and the air-fuel ratio slightly shifts toward the fuel-lean side. Referring to the graphs of FIGS. 4A through 4D with regard to the case where preignition occurs, the knocking does not decrease despite a delay of the ignition timing, so that the combustion chamber temperature increases and, therefore, a knocking of an increased magnitude occurs. This vicious circle causes a continuous increase in the ignition plug electrode temperature (representative temperature of the interior of the combustion chamber). As a result, the flow of air into the combustion chamber decreases, and the air-fuel ratio sharply shifts toward the fuel-rich side. Based on these findings, it is possible to determine that preignition has occurred, if knocking is not decreased by delaying the ignition timing and the air-fuel ratio shifts to toward the rich side.

Accordingly, it is an object of the present invention to provide an abnormal combustion detection apparatus for an internal combustion engine that is capable of quickly detecting occurrence of preignition through the use of a knock sensor on the basis of the foregoing findings.

According to the present invention, there is provided an abnormal combustion detection apparatus for an internal combustion engine, including a vibration detection device for detecting a knocking that occurs during combustion in the internal combustion engine, an air-fuel ratio detection device for detecting an air-fuel ratio of a combustion gas, an ignition timing control device for, if a knocking is detected by the vibration detection device, performing a delaying control such that an ignition timing is delayed toward a delayed side, a device for determining whether the knocking is decreased by the delaying control performed by the ignition timing control device if the knocking is detected, a device for comparing an air-fuel ratio detected by the air-fuel ratio detection device before the delaying control and an air-fuel ratio detected by the air-fuel ratio detection device after the delaying control, and a device for, if despite the delaying control performed by the ignition timing control device it is determined that the knocking remains not to decrease and it is determined through comparison that the air-fuel ratio detected after the delaying control is less than the air-fuel ratio detected before the delaying control, determining that preignition has occurred.

In this abnormal combustion detection apparatus, if despite the ignition timing delaying control performed upon detection of a knocking by the knock sensor, it is determined that the knocking remains not to decrease and it is determined through comparison that the air-fuel ratio detected after the delaying control is less than the air-fuel ratio detected before the delaying control, it is determined that preignition has occurred. Therefore, it can be precisely determined whether preignition has occurred.

In addition to the invention, the device for comparing an air-fuel ratio includes not only comparing an air-fuel ratio detected by the air-fuel ratio detection device before the delaying control and an air-fuel ratio detected by the air-fuel ratio detection device after the delaying control, but also detecting an air-fuel ratio being less than the air-fuel ratio detected before the delaying control.

According to the invention, in order to determine whether the knocking is decreased by the delaying control, a magnitude of a peak of vibration detected before the ignition timing is delayed may be compared with a magnitude of a peak of vibration detected after the ignition timing is delayed, and it may be determined whether the peak of vibration has changed in an increasing direction. It is also possible to determine whether after the ignition timing is delayed to a delay-side limit timing by the delaying control, a knocking is detected, in order to determine whether the knocking is decreased by the delaying control.

If it is determined whether there is an increase from the peak of vibration detected before the delay of ignition timing to the peak of vibration detected after the delay of ignition timing or whether after the ignition timing is delayed to the delay-side limit timing, a knocking is detected, in order to determine whether the knocking is decreased by the delaying control, as described above, it becomes possible to more precisely detect preignition.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
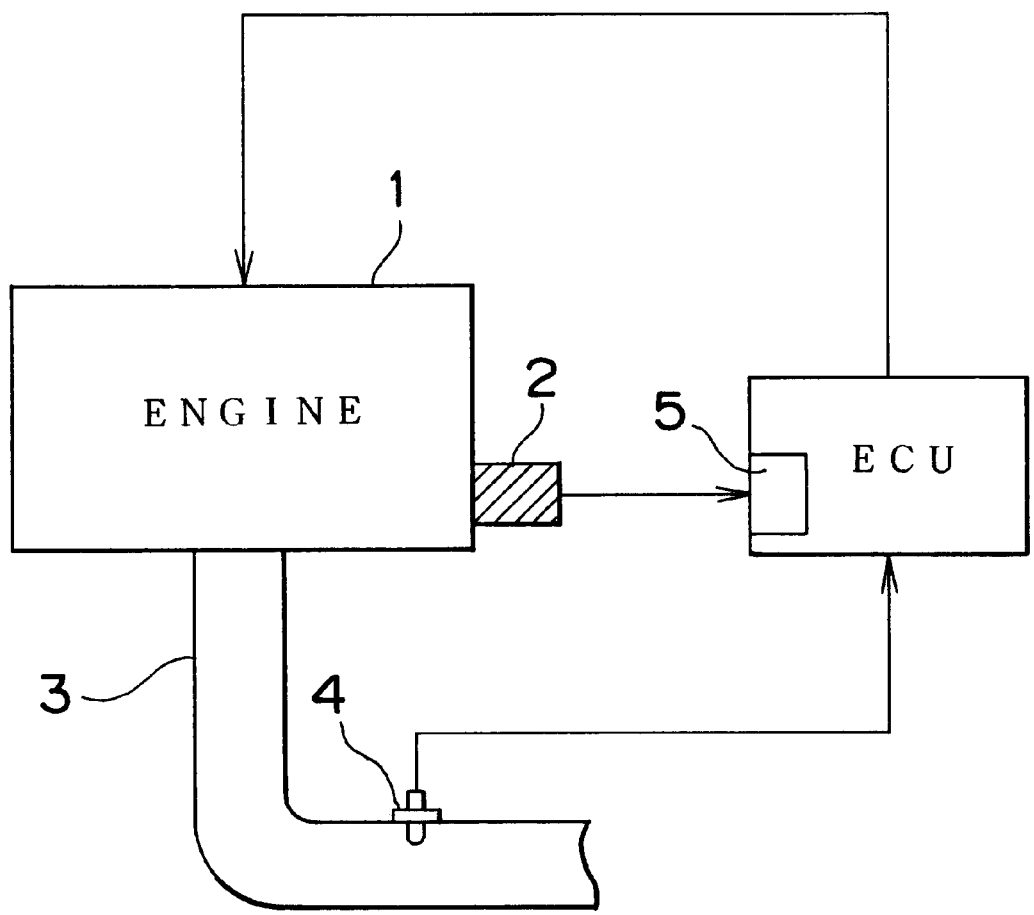
FIG. 1 is a schematic illustration of the construction of an internal combustion engine to which the invention is applied.

FIG. 1 illustrates main portions of an internal combustion engine that uses gasoline as a fuel. An engine 1 is equipped with a knock sensor 2 that functions as a transducer for converting a mechanical vibration of the engine 1 that occurs in accordance with combustion pressure fluctuation at a frequency level specific to knocking, into an electric signal as known to those skilled in the art. An exhaust pipe 3 is provided with an air-fuel ratio sensor 4 for detecting the air-fuel ratio, so that an electric signal in accordance with the air-fuel ratio can be obtained. The knock sensor 2 and the air-fuel ratio sensor 4 are connected to an electronic control circuit 5 that is provided in the form of a microcomputer.

Figure 2:
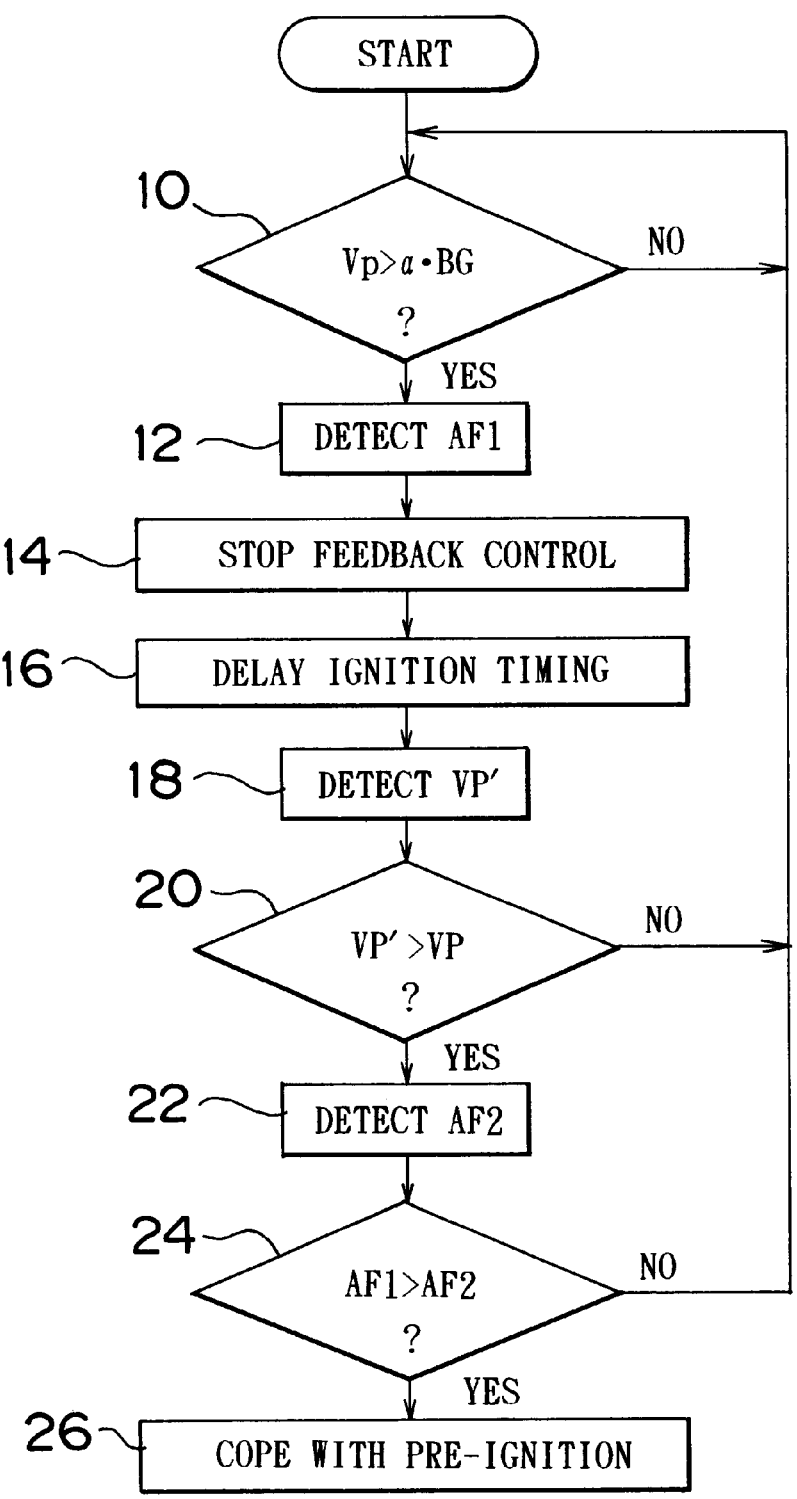
FIG. 2 is a flowchart illustration an operation of a first embodiment of the invention.
Figure 3A:
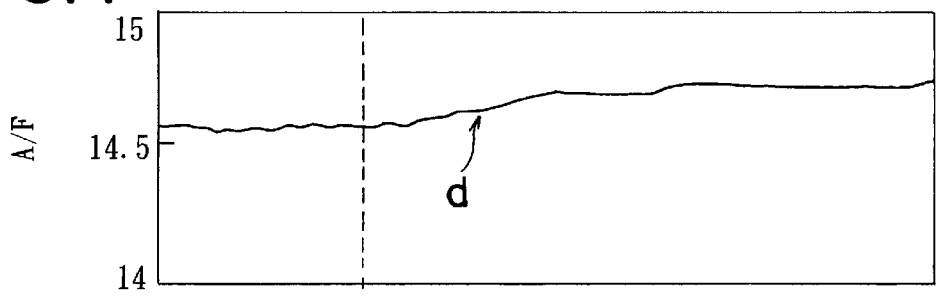
FIGS. 3A through 3D are timing charts illustrating an operation performed in the first embodiment at the time of an ordinary engine knocking.
Figure 3B:
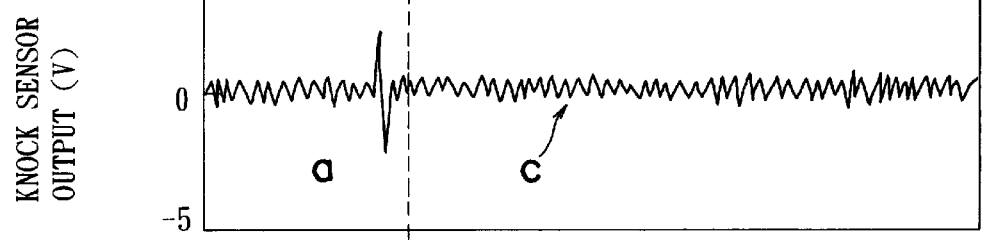
Figure 3C:
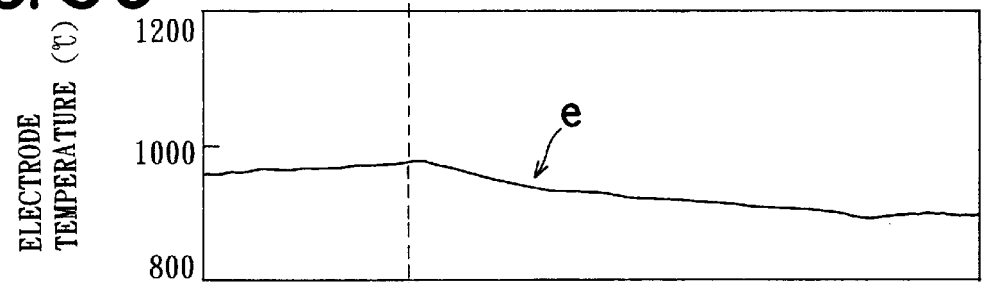
Figure 3D:
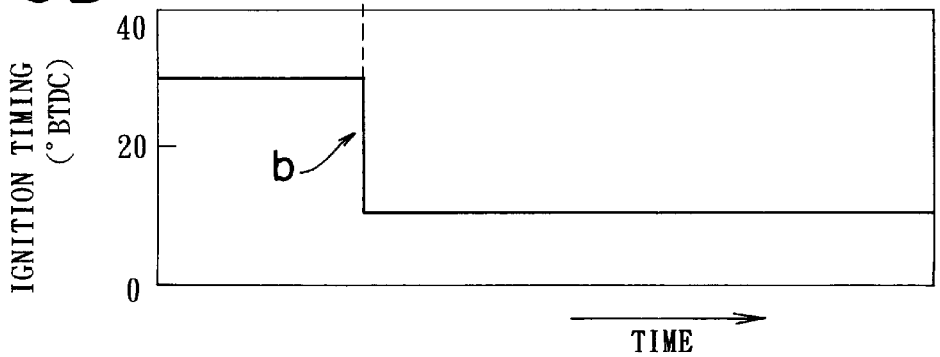
Figure 4A:
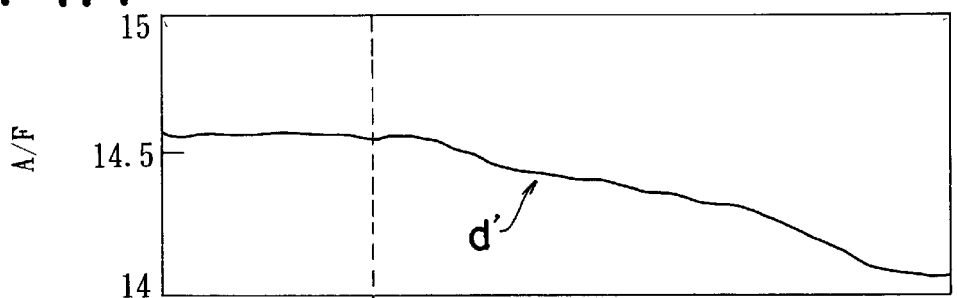
FIGS. 4A through 4D are timing charts illustrating an operation performed in the first embodiment at the time of preignition.
Figure 4B:
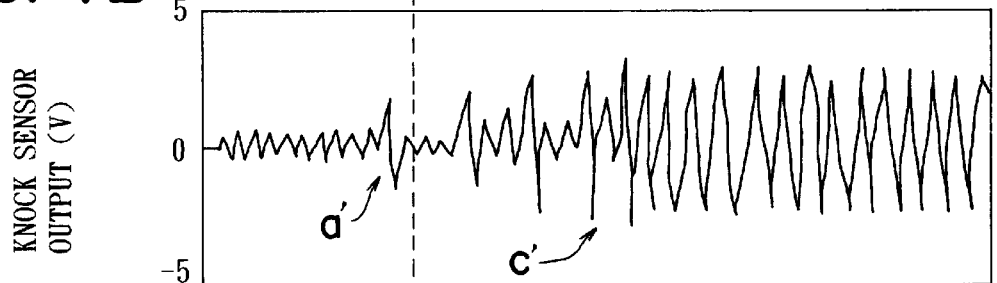
Figure 4C:
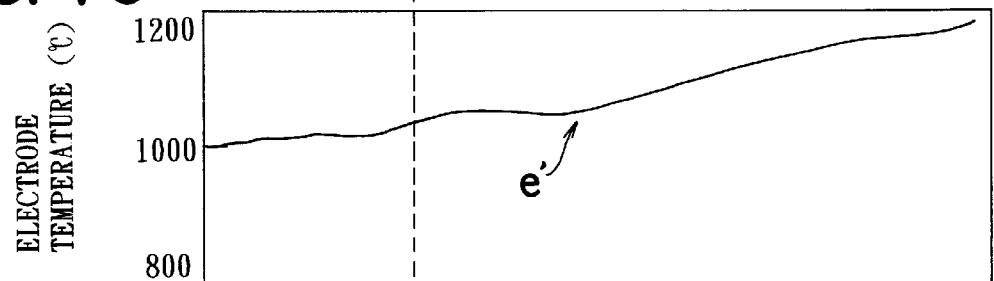
Figure 4D:
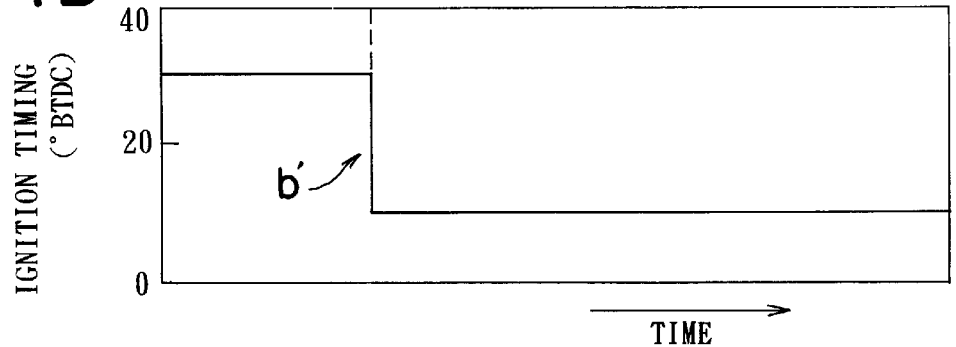

An operation of the electronic control circuit 5 will next be described with reference to the flowchart of FIG. 2 and the timing charts of FIGS. 3A through 3D and 4A through 4D. In step 10 in FIG. 2, the electronic control circuit 5 determines whether an engine knocking has occurred on the basis of the state of output from the knock sensor 2. More specifically, the determination as to whether a knocking has occurred is performed as follows. A mean value BG of peak output values from the knock sensor 2 during periods from the top dead center (TDC) to a crank angle of 90° when normal combustion occurs is determined separately for each cylinder through computation beforehand. The mean value BG is compared with a peak output value Vp actually produced by the knock sensor 2 during a period from the TDC to the crank angle of 90° during a combustion process. If it is determined that the peak output value Vp is greater than $\alpha$ times the mean value BG (normally, $\alpha$ is about 2), the electronic control circuit 5 determines that a knocking has occurred.

Figure 5:
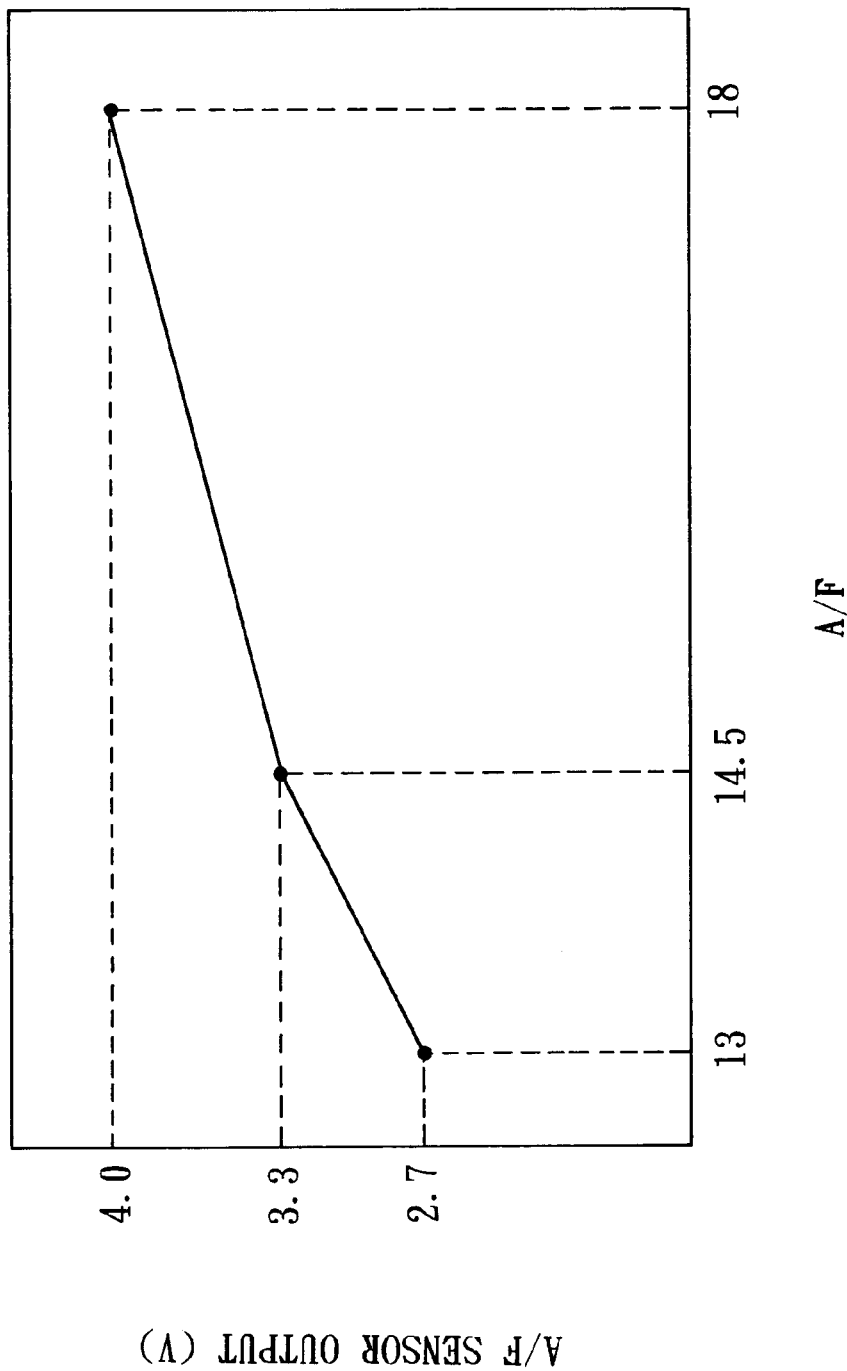
FIG. 5 is a graph indicating a relationship between the air-fuel ratio and the air-fuel ratio sensor output.

In step 12, subsequent to affirmative determination in step 10, the electronic control circuit 5 detects a present air-fuel ratio AF1 by taking in a signal from the air-fuel ratio sensor 4. FIG. 5 is a graph indicating a relationship between the air-fuel ratio A/F of a mixture supplied to the internal combustion engine and the value of output (V) from the air-fuel ratio sensor. The air-fuel ratio and the air-fuel ratio sensor output value have a one-to-one relationship, so that the output from the air-fuel ratio sensor 4 can be directly handled as an equivalent to the air-fuel ratio of mixture.

Subsequently in step 14, the electronic control circuit 5 stops the feedback control of air-fuel ratio performed by a fuel injection amount control device of the internal combustion engine. In the electronically controlled internal combustion engine, the feedback control is performed to adjust the amount of fuel injected so that the air-fuel ratio becomes a target value during a normal operating condition, on the basis of an output signal from the air-fuel ratio sensor 4. If the feedback control is continued after step 12, the amount of fuel injected is reduced to achieve the target air-fuel ratio, so that the determination with regard to preignition will become impossible. Therefore, the feedback control needs to be stopped.

Subsequently in step 16, the electronic control circuit 5 delays the ignition timing. That is, the electronic control circuit 5 performs the ignition timing control in such a manner that ignition will be performed at a timing delayed by a predetermined amount from the present ignition timing.

In step 18, the electronic control circuit 5 detects a peak output value Vp' produced by the knock sensor 2 at the time of combustion after the delay of ignition timing. Subsequently in step 20, the electronic control circuit 5 compares, in magnitude, the peak output value Vp' produced by the knock sensor 2 at the time of combustion before the delay of ignition timing and the peak output value Vp' produced at the time of combustion after the delay of ignition timing. If Vp'>Vp, that is, if the peak value after the delay of ignition timing is greater than the peak value before the delay of the ignition timing, it is determined that knocking has increased in magnitude (knocking has not decreased). In this case, operation proceeds to step 22, where an air-fuel ratio AF2 occurring at that time is detected by taking in the output signal from the air-fuel ratio sensor 4. Subsequently in step 24, it is determined whether AF1>AF2, that is, whether the air-fuel ratio AF2 detected after the delay of ignition timing is less than the air-fuel ratio AF1 detected before the delay of ignition timing (whether the air-fuel ratio has shifted toward the rich side). If it is determined that AF1>AF2 in step 24, it can be determined that the knocking has increased in magnitude and, therefore, preignition has occurred. In this case, operation proceeds to step 26, where the electronic control circuit 5 performs an operation needed to cope with preignition, for example, an operation of stopping the fuel injection or closing a throttle valve, or the like, in order to prevent a fusion damage to the engine, or the like.

If negative determination is made in step 20 or step 24, the feedback control of air-fuel ratio is restarted.

FIGS. 3A through 3D indicate the transition of the air-fuel ratio A/F, the output voltage V of the knock sensor 2, the ignition plug electrode (central electrode) temperature (° C.), and the ignition timing (a pre-TDC angle), where an ordinary engine knocking occurs without preignition caused. If the knock sensor peak output value is greater than a predetermined value (as indicated by a in FIG. 3B), the ignition timing is delayed by a predetermined amount (as indicated by b in FIG. 3D). If the knock sensor peak output value being greater than the predetermined value is a result of an ordinary knocking, the fluctuation of the knock sensor output voltage is converged (as indicated by c in FIG. 3B) by the delay of ignition timing. In response, the air-fuel ratio increases (shifts toward the lean side as indicated by d in FIG. 3A), and the ignition plug electrode temperature decreases (as indicated by e in FIG. 3C).

FIGS. 4A through 4D indicate the transition of the air-fuel ratio A/F, the output voltage V of the knock sensor 2, the ignition plug electrode (central electrode) temperature (0° C.), and the ignition timing (a pre-TDC angle), where preignition occurs. If the knock sensor peak output value is greater than a predetermined value (as indicated by a' in FIG. 4B), the ignition timing is delayed by a predetermined amount (as indicated by b' in FIG. 4D). Since the knock sensor peak output value being greater than the predetermined value is a result of preignition, the fluctuation of the knock sensor output voltage is not converged (as indicated by c' in FIG. 4B) by the delay of ignition timing. Therefore, the air-fuel ratio decreases (shifts toward the rich side as indicated by d' in FIG. 4A), and the ignition plug electrode temperature increases (as indicated by e' in FIG. 4C).

Figure 6:
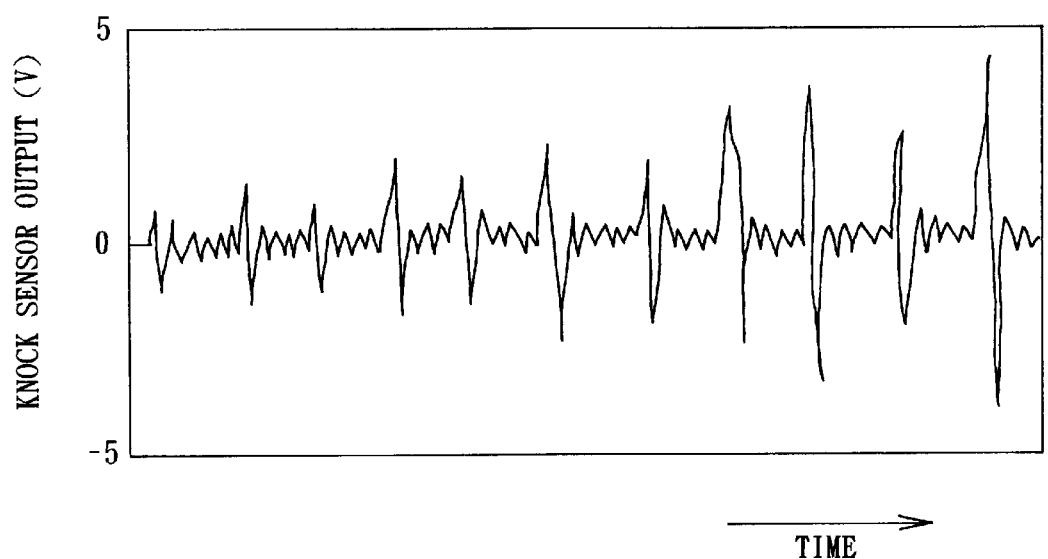
FIG. 6 is a diagram illustrating the waveform of a signal from a knock sensor.

A second embodiment of the invention will be described below. The first embodiment is designed on the precondition that if preignition has occurred, the peak of combustion vibration serially increases at every combustion process. In reality, however, the vibration does not necessarily increase at every combustion process even if preignition has occurred. FIG. 6 is a diagram indicating the output of the knock sensor in a case where preignition has occurred under a certain condition. In an overall view of the diagram, it can be said that the peak of combustion vibration changes in an increasing direction at every combustion process. However, a closer view to individual peaks reveals that there are some vibration peaks that are smaller than their predecessors. The second embodiment is intended to precisely detect preignition even if a vibration peak is smaller than the previous one.

Figure 7:
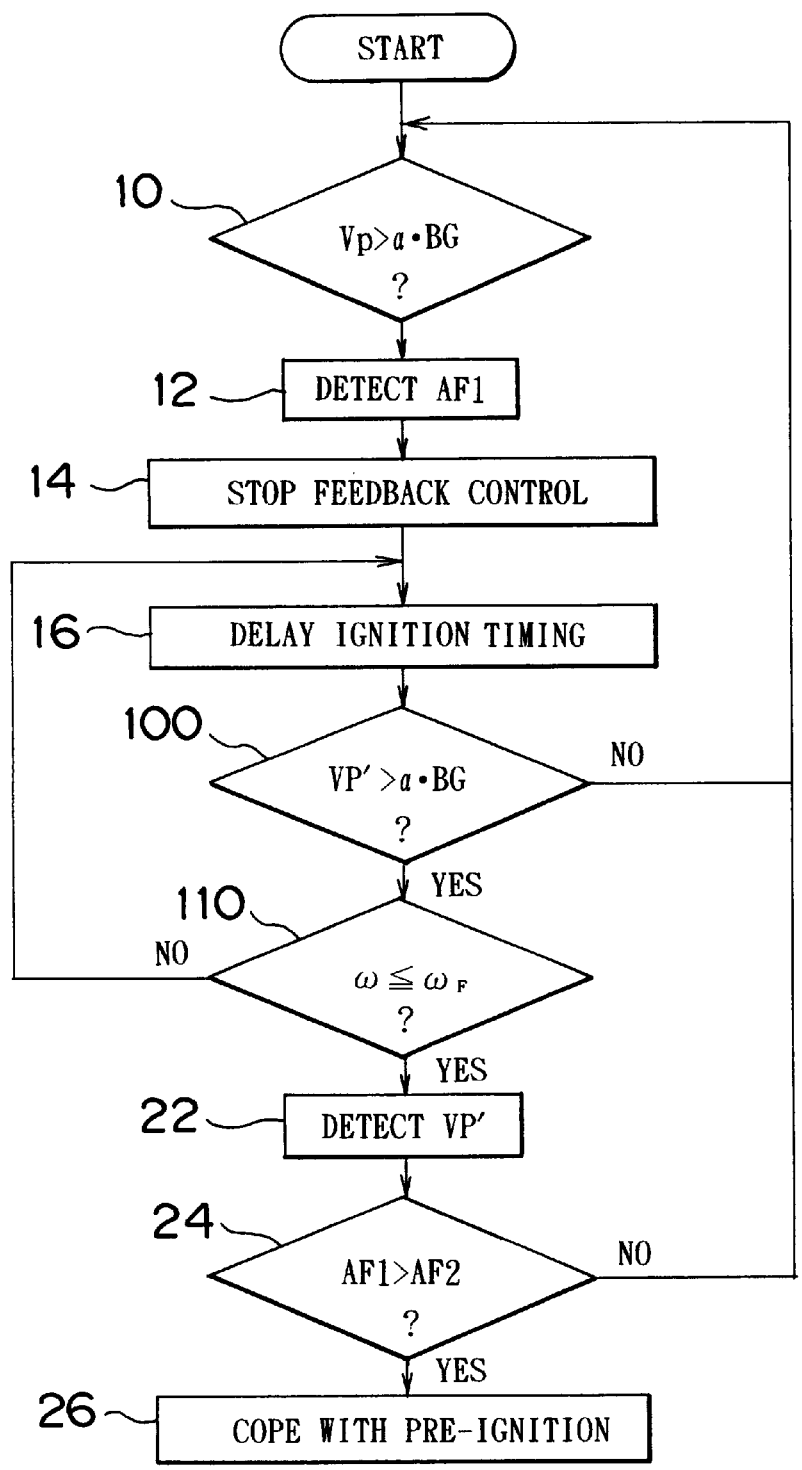
FIG. 7 is a flowchart illustration an operation of a second embodiment of the invention.

FIG. 7 is a flowchart illustrating an operation of the second embodiment. The processing in steps 10 through 16 is the same as the processing in comparable steps in the first embodiment. That is, in step 10, it is determined whether the peak output value Vp produced by the knock sensor 2 is greater than a times the mean value BG of peak output values from the knock sensor 2 that occur when combustion is normal. If the determination is affirmative, an air-fuel ratio AF1 is detected in step 12. In step 14, the feedback control is stopped. In step 16, the ignition timing delaying control is performed.

Subsequently in step 100, the electronic control circuit 5 takes in a peak output value Vp' produced by the knock sensor 2 at the time of combustion after the delay of ignition timing, and determines whether the peak output value Vp' is greater than α times the mean value BG of peak output values produced during normal combustion as in step 10. If the determination in step 100 is affirmative, the electronic control circuit 5 determines in step 110 whether the value of the present ignition timing ω is equal to or less than a delay-side limit value ωF. The processing in step 110 is provided for the following purpose. That is, in a case where the electronic control circuit 5 performed the ignition timing control in step 16 in such a manner as to perform ignition at a timing delayed by a predetermined amount from the ignition timing used at that time and, subsequently in step 100, the control circuit 5 determined that the peak value Vp' of the knock sensor 2 at the time of combustion after the delay of ignition timing was greater than α times the mean value BG of peak output values produced during normal combustion, that is, in a case where the knocking has not decreased, the ignition timing is preferably delayed again in order to decrease the knocking. Normally, a delay-side limit value is set for the ignition timing, so that the ignition timing is not delayed beyond the delay-side limit value by the electronic control circuit 5. If the present ignition timing has not reached the delay-side limit value, operation returns to step 16, so that the ignition timing is further delayed. If it is determined in step 110 that the ignition timing has been delayed to the delay-side limit value, operation proceeds to step 22, where the present air-fuel ratio AF2 is detected. Subsequently in step 24, it is determined whether the air-fuel ratio AF2 detected after the delay of ignition timing is less than the air-fuel ratio AF1 detected before the delay of ignition timing. If it is determined that AF1>AF2, it means that despite the delay of the ignition timing to the delay-side limit value, the knocking has not decreased and the air-fuel ratio has shifted toward the rich side. That is, it can be determined that preignition has occurred, as explained above in conjunction with the first embodiment. In this case, therefore, operation proceeds to step 26, where the electronic control circuit 5 performs an operation needed to cope with preignition, for example, an operation of stopping the fuel injection or closing the throttle valve, or the like, in order to prevent a fusion damage to the engine, or the like.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An abnormal combustion detection apparatus for an internal combustion engine, comprising:

means for detecting knocking that occurs during combustion in the internal combustion engine;

means for detecting an air-fuel ratio of a combustion gas;

means for delaying an ignition timing when knocking is detected by the vibration detection means;

means for determining whether knocking has been decreased by the delaying of the ignition timing performed when knocking is detected;

means for comparing an air-fuel ratio detected before the delaying of the ignition timing to an air-fuel ratio detected after the delaying of the ignition timing; and means for determining that preignition has occurred when, despite the delaying of the ignition timing, the knocking has not decreased and the air-fuel ratio detected after the delaying of the ignition timing is less than the air-fuel ratio detected before the delaying of the ignition timing.

2. An apparatus according to claim 1, wherein the means for determining whether knocking has decreased compares a magnitude of a peak of vibration detected before the delaying of the ignition timing to a magnitude of a peak of vibration detected after the delaying of the ignition timing.

3. An apparatus according to claim 1, wherein the means for determining whether knocking has decreased determines whether, after the ignition timing has been delayed to a delay-side limit timing, knocking is detected.

4. An apparatus according to claim 3, wherein the delaying control is performed on the basis of a predetermined amount at a time.

5. An apparatus according to claim 1, wherein after detection of an air-fuel ratio occurring before the ignition timing is delayed, a feedback control of the air-fuel ratio is stopped.

6. An abnormal combustion detection apparatus for an internal combustion engine, comprising:

a vibration detecting sensor for detecting a vibration that occurs during combustion in the internal combustion engine;

an air-fuel ratio detecting sensor for detecting an air-fuel ratio of a combustion gas;

means for delaying, when a vibration is detected by the vibration detecting sensor, an ignition timing;

means for determining whether the vibration is reduced by the delaying of the ignition timing performed when the vibration is detected;

means for comparing an air-fuel ratio detected before the delaying of the ignition timing and an air-fuel ratio detected after the delaying of the ignition timing; and means for determining that preignition has occurred when, despite the delaying of the ignition timing, it is determined that the vibration has not decreased and it is determined that the air-fuel ratio detected after the delaying of the ignition timing is less than the air-fuel ratio detected before the delaying of the ignition timing.

7. An apparatus according to claim 6, wherein in order to determine whether the vibration is reduced by the delaying control, a magnitude of a peak of vibration detected before the ignition timing is delayed is compared with a magnitude of a peak of vibration detected after the ignition timing is delayed, and it is determined whether the peak of vibration has changed in an increasing direction.

8. An apparatus according to claim 6, wherein in order to determine whether the vibration has been reduced by the delaying of the ignition timing, it is determined whether after the ignition timing has been delayed to a delay-side limit timing by the delaying control, a vibration is detected.

9. An apparatus according to claim 8, wherein the delaying control is performed on the basis of a predetermined amount at a time.

10. An apparatus according to claim 6, wherein after an air-fuel ratio occurring before the ignition timing is delayed is detected, a feedback control of the air-fuel ratio is stopped.

11. An abnormal combustion detection method for an internal combustion engine, comprising the steps of:

detecting a vibration that occurs during combustion in the internal combustion engine; and determining that preignition has occurred when, despite the delaying of an ignition timing performed by an ignition timing control means it is determined that the vibration has not decreased and it is determined that an air-fuel ratio detected after the delaying of the ignition timing is less than an air-fuel ratio detected before the delaying of the ignition timing.

12. A method according to claim 11, wherein in order to determine whether the vibration has been reduced by the ignition timing delaying control, a magnitude of a peak of vibration detected before the ignition timing is delayed is compared with a magnitude of a peak of vibration detected after the ignition timing has been delayed, and it is determined whether the peak of vibration has changed in an increasing direction.

13. A method according to claim 11, wherein in order to determine whether the vibration has been reduced by the ignition timing delaying control, it is determined whether after the ignition timing has been delayed to a delay-side limit timing by the ignition timing delaying control, a vibration is detected.

14. A method according to claim 13, wherein the ignition timing delaying control is performed on the basis of a predetermined amount at a time.

* * * * *